United States Patent
Bungo

(10) Patent No.: US 8,667,941 B2
(45) Date of Patent: Mar. 11, 2014

(54) FUEL COCK-INTEGRATED ENGINE SWITCH

(75) Inventor: Keiichiro Bungo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 297 days.

(21) Appl. No.: 13/158,640

(22) Filed: Jun. 13, 2011

(65) Prior Publication Data

US 2012/0048233 A1 Mar. 1, 2012

(30) Foreign Application Priority Data

Aug. 24, 2010 (JP) ................................ P2010-187436

(51) Int. Cl.
*F02N 11/10* (2006.01)
*F02N 11/08* (2006.01)
*F02N 11/14* (2006.01)

(52) U.S. Cl.
USPC .................................... 123/179.3; 123/198 D

(58) Field of Classification Search
USPC .................. 123/179.3, 179.5, 406.47, 198 D, 123/198 DB, 198 DC, 185.5; 261/38, 119.2
See application file for complete search history.

(56) References Cited

U.S. PATENT DOCUMENTS

| | | | | |
|---|---|---|---|---|
| 4,524,736 A | * | 6/1985 | Sackett | 123/198 D |
| 4,862,850 A | * | 9/1989 | Janisch et al. | 123/198 DC |
| 5,301,644 A | * | 4/1994 | Olmr | 123/198 DB |
| 5,485,814 A | * | 1/1996 | Tuggle et al. | 123/179.5 |
| 6,227,171 B1 | * | 5/2001 | Matsuda | 123/458 |
| 8,132,554 B2 | * | 3/2012 | Koenen | 123/198 D |
| 2007/0006840 A1 | | 1/2007 | Hedlund | |
| 2009/0260596 A1 | | 10/2009 | Johnson | |
| 2011/0146611 A1 | * | 6/2011 | Gorenflo et al. | 123/179.28 |

FOREIGN PATENT DOCUMENTS

| | | | |
|---|---|---|---|
| CN | 2446337 Y | 9/2001 | |
| DE | 10 2006 026 387 A1 | 1/2007 | |
| EP | 2 112 355 A1 | 10/2009 | |
| GB | 144393 A | 7/1976 | |
| JP | 43-029202 Y | 12/1968 | |
| JP | 53-015413 U | 2/1978 | |
| JP | 57155022 A * | 9/1982 | F23N 5/24 |
| JP | 2002-147304 A | 5/2002 | |
| JP | 2004-293475 A | 10/2004 | |
| JP | 2004-316181 A | 11/2004 | |

OTHER PUBLICATIONS

Chinese Office Action; Chinese Patent Application No. 2011 1024 7007.X, dated Jun. 26, 2013.
Japanese Office Action, Japanese Patent Application 2010-187436 dated Oct. 30, 2013.

* cited by examiner

*Primary Examiner* — Mahmoud Gimie
(74) *Attorney, Agent, or Firm* — Arent Fox LLP

(57) ABSTRACT

A fuel cock-integrated engine switch is provided that reduces wear resulting from mechanical contact and that can thereby enhance durability. A magnet 14 is provided in a lever 11 that is pivoted turnably between an ON position and an OFF position. A reed switch 12 connected to an ignition device 17 is arranged in the ON position. A shutoff valve 2 of a fuel passage is arranged in the OFF position of the lever 11. In the OFF position, the magnet 14 of the lever 11 approaches a valve 3 formed with a magnetic member, and the member 3 is shifted upward within the case 4 to shut off the fuel passage. When the lever 11 is operated to shift to the ON position, the valve 3 is shifted downward within the case 4 or receives a force applied by a spring to open the fuel passage.

13 Claims, 4 Drawing Sheets

FUEL COCK-INTEGRATED ENGINE SWITCH

TECHNICAL FIELD

The present invention relates to a fuel cock-integrated engine switch, and more particularly, relates to a fuel cock-integrated engine switch that is suitable to perform, in a coordinated manner, the opening and closing of a fuel passage provided between a fuel tank and a carburetor and the operation of an engine switch.

BACKGROUND ART

Conventionally, a general-purpose engine used in an operating machine or the like adopts a carburetor to supply a mixture of fuel and air to the engine; in order to start the engine, it is necessary to turn on an engine switch with a fuel cock opened to allow fuel supply to the engine. On the other hand, even when the fuel cock is not closed, the engine switch is simply turned off to stop the ignition, and thus the operation of the engine is stopped. Hence, it is likely that, when the engine is stopped, only the engine switch is turned off but the fuel cock is mistakenly left open. In this case, the fuel may diffuse into the air or flow into the engine.

To solve this problem, a structure for preventing a fuel cock from being mistakenly left open when an engine is stopped is proposed. For example, in a fuel cock structure disclosed in Patent Document 1, a mechanism is provided in which the turning operation of a switching lever pivoted on the main body of a fuel cock is performed, in a coordinated manner, together with the turning of a switch case with respect to an inner case; the fuel cock of a carburetor is proposed in which a contact of an engine switch is provided on each of the side of the inner case and the side of the switch case. In this conventional art, when the switching lever is turned to a stop position when the engine is stopped, a fuel passage between a fuel tank and the carburetor is closed, and the contact of the engine switch is opened, in a coordinated manner, together with the movement of the switching lever, with the result that the ignition function of the engine is stopped. In this way, the supply of fuel to the carburetor is stopped and simultaneously the ignition function of the engine is stopped.

CITATION LIST

Patent Literature

Patent Literature 1 Japanese unexamined Patent Publication No. 2004-293475

SUMMARY OF INVENTION

Technical Problem

The conventional fuel cock disclosed in Patent Document 1 has the following problems to be solved. First, since the inner case within the switch case and the switching lever outside the switch case are coupled to each other, it is necessary to arrange a seal between a shaft of the inner case passing through the switch case and the switch case, with the result that a torque for operating a manipulation lever is likely to be increased. Since the engine case is turned with respect to the inner case with a projection provided on the switching lever being in contact with a recess provided in the engine case, a mechanical contact surface is likely to wear. Furthermore, since, in order for a click hold feeling to be produced when the switching lever is switched between an operation position, an intermediate position and a stop position, a mechanism where a ball to which a force is applied by a spring passes over a protruding notch portion, the mechanical contact surface may also wear.

In view of the foregoing problems, an object of the present invention is to provide a fuel cock-integrated engine switch that reduces a mechanical contact surface and can thereby enhance durability against wear.

Solution to Problem

To achieve the above object, a first feature of the present invention is a fuel cock-integrated engine switch comprising: a fuel shutoff valve that is provided in a fuel passage supplying fuel to an engine and that includes a valve member which closes the fuel passage in a first position and which opens the fuel passage in a second position; an operation member that is operated between an off position for stopping the engine and an on position for operating the engine; a proximity switch that is provided in the on position; and a permanent magnet that is attached to at least one of the operation member and the valve member, wherein the other one of the operation member and the valve member to which the permanent magnet is not attached is formed with a magnetic member, the operation member and the valve member are arranged so that, in the off position, a magnetic force exerted by the permanent magnet acts between the valve member and the operation member to make the valve member shift to the first position whereas, in the on position, the magnetic force exerted by the permanent magnet does not act between the valve member and the operation member to make the valve member shift to the second position, and an ignition device is connected to the proximity switch so that, when the operation member approaches an operational range of the proximity switch, the ignition device of the engine is operated whereas, when the operation member is out of the operational range of the proximity switch, the ignition device is not operated.

A second feature of the present invention is a fuel cock-integrated engine switch comprising: a fuel shutoff valve that is provided in a fuel passage supplying fuel to an engine and that includes a valve member which closes the fuel passage in a first position and which opens the fuel passage in a second position; an operation member that is operated between an off position for stopping the engine and an on position for operating the engine and that is formed with a magnetic member; a proximity switch that is arranged close to the valve member on a side of the second position; and a permanent magnet that is provided either in a whole of the valve member or at least in both end portions of the valve member in a shift direction, wherein the operation member and the valve member are arranged so that, in the off position, a magnetic force exerted by the permanent magnet provided in the valve member acts on the operation member to make the valve member shift to the first position whereas, in the on position, the magnetic force exerted by the permanent magnet provided in the valve member does not act on the operation member to make the valve member shift to the second position, and an ignition device is connected to the proximity switch so that, when the valve member approaches an operational range of the proximity switch, the ignition device of the engine is operated whereas, when the valve member is out of the operational range of the proximity switch, the ignition device is not operated.

A third feature of the present invention is a fuel cock-integrated engine switch further comprising: a valve case that accommodates the valve member so that the valve member is movable in a reciprocating manner between the first position and the second position, wherein a fuel introduction side and a fuel discharge side of the fuel passage are coupled to a wall portion of the valve case, and a portion of the fuel passage that is coupled to the valve case is closed in the first position and is opened in the second position by a side surface portion of the valve member.

A fourth feature of the present invention is that the valve member is cylindrical, the valve case includes a cylinder portion that accommodates the cylindrical valve member and the fuel introduction side and the fuel discharge side of the fuel passage are open to the cylinder portion.

A fifth feature of the present invention is that the operation member is an operation lever that is pivoted and that is formed with a nonmagnetic member, and the permanent magnet is embedded in the operation lever.

A sixth feature of the present invention is that the permanent magnet is attached to the operation member, the valve member is formed with a magnetic member and, in the on position of the operation member, a limiter that is arranged between the operation member and the proximity switch and that is formed with a magnetic member is arranged.

A seventh feature of the present invention is a fuel cock-integrated engine switch comprising: a valve case that is provided in a fuel passage supplying fuel to an engine and that includes a cylindrical valve member accommodation portion; a valve member including a fuel passage hole penetrating a cylinder in a direction of a diameter of the cylinder that is formed with a cylindrical nonmagnetic member accommodated in the valve case turnably about a cylinder axis of the accommodation portion within the cylindrical valve member accommodation portion and that forms the valve member; an operation lever that is provided between an off position for stopping the engine and an on position for operating the engine so as to be turned on a same axis as the cylinder axis; and a proximity switch that is arranged in the on position, wherein, on a side portion of the cylinder that forms the valve member, at least one of a magnetic member and a permanent magnet is arranged, the other one of the magnetic member and the permanent magnet arranged, via the valve case, opposite to the one of the magnetic member and the permanent magnet is attached to the operation lever, and the one of the magnetic member and the permanent magnet turns together with a movement of the operation lever, the valve member and the valve case are arranged so that, when the operation lever is in the on position, the fuel passage hole is aligned with the fuel passage, and an ignition device is connected to the proximity switch so that, when the operation lever approaches an operational range of the proximity switch, the ignition device of the engine is operated whereas, when the operation lever is out of the operational range of the proximity switch, the ignition device is not operated.

An eighth feature of the present invention is that the valve case includes a boss that is arranged coaxially with the cylinder axis of the cylindrical valve member accommodation portion, and the operation lever is freely turned attached to the boss.

An ninth feature of the present invention is that the permanent magnet is provided as the other one of the magnetic member and the permanent magnet provided in the operation lever, and a limiter is arranged close to the permanent magnet when the operation lever is in the on position.

Advantageous Effects of Invention

According to the present invention having the first to fifth features, since at least one of the operation member and the valve member is the permanent magnet, and the other one in which the permanent magnet is not provided is the magnetic member, when the operation member is operated to shift to the off position, they are attracted to each other by a magnetic force exerted by the permanent magnet. Consequently, the valve member is shifted to the first position to close the fuel passage, and the proximity switch is operated so that the ignition device is not operated. On the other hand, when the operation member is operated to shift to the on position, since the valve member is separated from the operation member and the magnetic force exerted by the permanent magnet does not act on the valve member, the valve member is shifted to the second position to open the fuel passage, and the proximity switch is operated so that the ignition device can be operated. In this engine switch, since the operation member and the shutoff valve are not mechanically in contact with each other, it is possible to obtain high durability against wear.

According to the present invention having the sixth feature, when the operation member is operated to shift to the on position, the permanent magnet attached to the operation member is adsorbed to the limiter. It is therefore possible to make the user feel the click hold feeling when the operation member is operated to shift to the on position, without adopting a configuration in which mechanical wear occurs, such as an engagement between a notch and a ball.

According to the present invention having the seventh to ninth features, since the valve member is turned together with the operation of the operation lever by the action of the magnetic force, wear resulting from mechanical contact does not occur between the operation lever and the shutoff valve.

DESCRIPTION OF EMBODIMENTS

Figure 5:
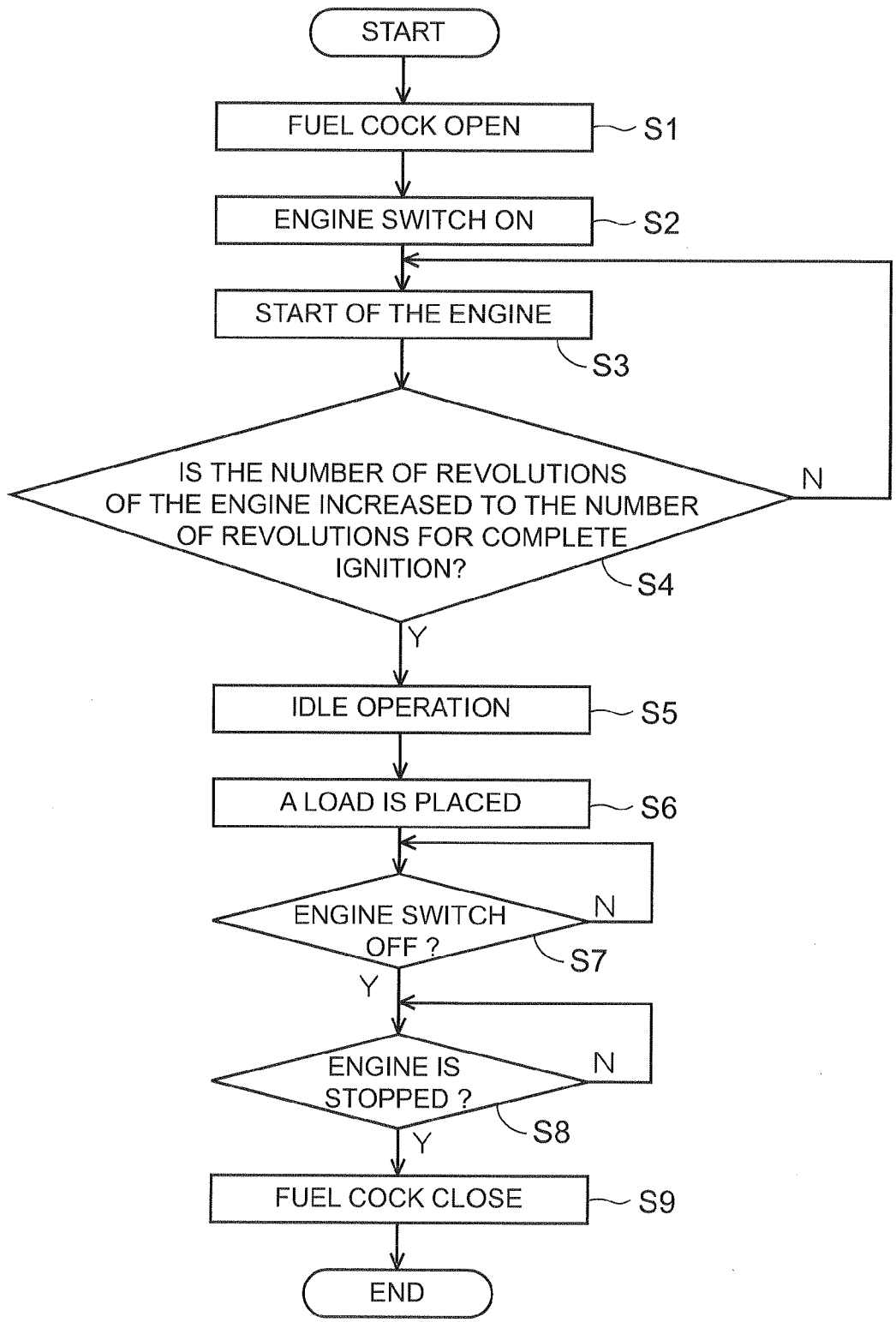
FIG. 5 is a flowchart showing the operation of an engine-driven operating machine.

An embodiment of the present invention will be described below with reference to accompanying drawings. FIG. 5 is a flowchart illustrating an operation of an operator and an engine from the start of the engine to the stop of the engine in an engine-driven operating machine (for example, a lawn mower).

As shown in FIG. 5, in step S1, the operator opens a fuel cock provided in a fuel passage (a pipe passage between a fuel tank and a carburetor). In general, the operator rotates the lever of the fuel cock provided with the carburetor to open a valve provided in the fuel passage, and thereby ensures the fuel passage from the fuel tank to the carburetor.

In step S2, the operator turns on an engine switch. Thus, an ignition device is brought into a state in which the ignition device can be started. After the engine switch is turned on, in step S3, a cell starter connected to a recoil starter or a battery is used to rotate the engine. Thus, in a magnetic field that is generated by a flywheel coupled to a crank shaft of the engine, a magnet incorporated in a part of the flywheel and a yoke of an ignition coil arranged close to the flywheel, electromagnetic induction occurs, and an electromotive voltage is generated in an exciting coil within the ignition coil, with the result that the ignition is started.

In step S4, the control unit (in general, a microcomputer) of the engine-driven operating machine determines whether or not the number of revolutions of the engine is increased to the number of revolutions for complete ignition. If, in step S4, the positive determination is made, in step S5, an idle operation is performed. Specifically, the control unit performs control so that the number of revolutions of the engine reaches a predetermined idle target number of revolutions. Here, a load can be placed; when, in step S6, the load is placed, the control unit increases the number of revolutions of the engine according to the magnitude of the load so as to respond to the load.

If the operation is completed, in step S7, the operator turns off the engine switch. Thus, the ignition device stops the ignition. As the ignition device and the engine switch, there are known a short-circuit type in which the electromotive voltage of the exciting coil is short-circuited to the engine by turning off the engine switch and an open type in which the electromotive voltage of the exciting coil is returned to the ignition device via the engine switch and the ignition is stopped by opening the engine switch.

In step S8, the control unit determines whether the engine is stopped. If the engine is determined to be stopped, the control unit notifies the operator of the stop of the engine such as by turning on a stop lamp. If the operator recognizes the stop of the engine, the fuel cock is closed (step S9).

In general, the engine-driven operating machine starts and completes the operations in the procedure shown in the flowchart described above. However, in a series of operations described above, when the engine is stopped, the engine switch may only be turned off, and the fuel cock may be mistakenly left open. To solve this problem, in the present embodiment, the engine-driven operating machine is provided with a fuel cock-integrated engine switch that will be described below.

Figure 1:
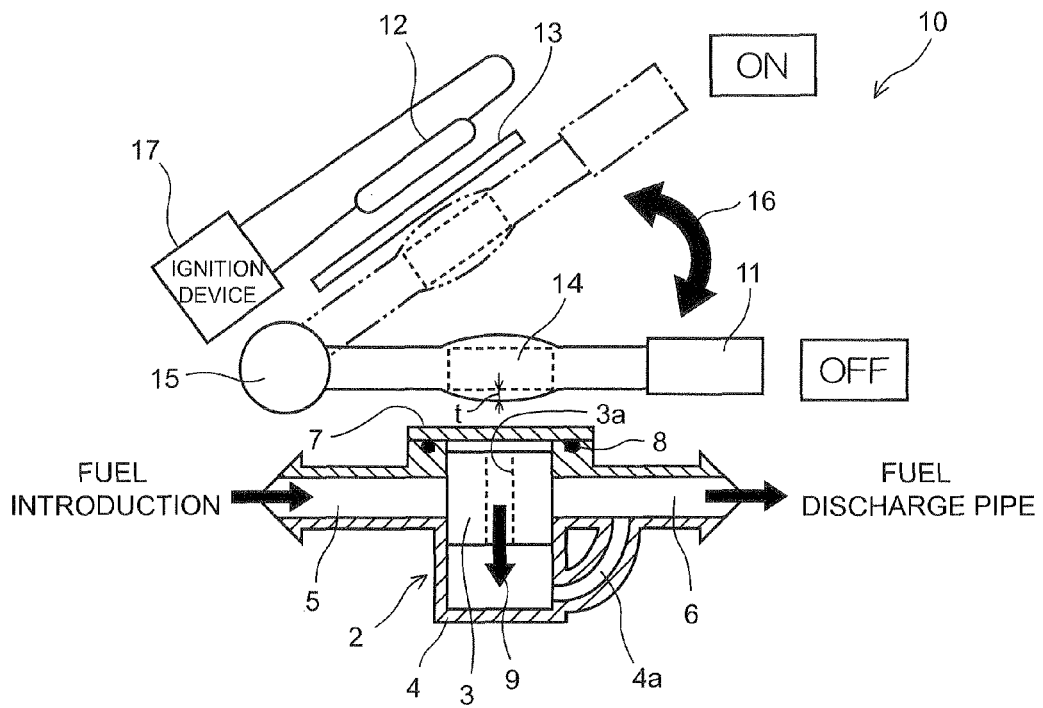
FIG. 1 is a diagram showing the configuration of a fuel cock-integrated engine switch according to an embodiment of the present invention.

FIG. 1 is a diagram showing the configuration of a fuel cock-integrated engine switch according to an embodiment of the present invention. In FIG. 1, a shutoff valve 2 is provided in a fuel passage connecting a fuel tank and a carburetor that are not shown. The shutoff valve 2 has a valve member 3 and a valve case 4 which accommodates the valve member 3 so that the valve member 3 is movable up and down. The valve case 4 is coupled to a fuel introduction pipe 5 and a fuel discharge pipe 6. The valve case 4 is preferably formed integrally with the fuel introduction pipe 5 and the fuel discharge pipe 6. A lid 7 is provided on the top of the valve case 4. A seal 8 such as an O-ring is provided on a surface on which the lid 7 and the valve case 4 are in contact with each other.

The valve member 3 is preferably cylindrical. The valve case 4 has a cylindrical space so that the cylindrical valve member 3 can move in a direction of the axis of the cylinder, that is, move up and down within the valve case 4; the valve member 3 is formed to have a length (a vertical dimension) so that the valve member 3 can move with a predetermined stroke. The valve case 4, the fuel introduction pipe 5, the fuel discharge pipe 6 and the lid 7 are formed of nonmagnetic material, for example, resin or aluminum. On the other hand, the valve member 3 is formed of a magnetic member that can be adsorbed by a magnet, for example, iron. It is not necessary for the entire valve member 3 to be formed of a magnetic member; at least a part of the valve member 3 arranged on the side of the lid 7 should be formed of a magnetic member.

When the valve member 3 is placed in a first position shown in FIG. 1, the shutoff valve 2 is in a closed position, the communication between the fuel introduction pipe 5 and the fuel discharge pipe 6 is shut off and the distribution of the fuel within the fuel passage 1 is shut off. On the other hand, when the valve member 3 is shifted, in a direction indicated by an arrow 9, from the position shown in FIG. 1 down to a lower limit position, that is, a second position, the shutoff valve 2 is in an open position, the fuel introduction pipe 5 and the fuel discharge pipe 6 communicate with each other and the distribution of the fuel within the fuel passage 1 is allowed.

In order for the valve member 3 to shift smoothly within the valve case 4, it is necessary to pay attention to the accuracy of the outside diameter dimension of the valve member 3 and the inside diameter dimension of the valve case 4, and it is preferable to chamfer the top and bottom ends of the valve member 3 to remove corners and to treat the surface of the valve member 3, for example, treat the side surface of the valve member 3 with fluorine resin, to achieve smooth sliding. Moreover, when the valve member 3 shifts within the valve case 4, it is preferable to provide a passage through which the fuel that is to be eliminated from the valve member 3 is discharged. Preferably, for example, a fuel discharge passage 3a that penetrates the valve member 3 vertically is provided, or a fuel discharge passage 4a that makes the valve case 4 communicate with the fuel discharge pipe 6 is provided.

The shutoff valve 2 may be inclined depending on the layout of the fuel passage, and it is expected that it is difficult for the valve member 3 to shift, within the valve case 4, to the side to which the valve member 3 opens the fuel passage due to its own weight. In this case, preferably, a spring is arranged between the top surface of the valve member 3 and the lid 7, and thus the valve member 3 can easily shift when an operation lever 11 separates from the shutoff valve 2 to shift to an on position.

In FIG. 1, an engine switch 10 is arranged above the shutoff valve 2. The engine switch 10 is composed of the operation lever 11, a reed switch (proximity switch) 12 and a limiter (a plate member formed of a magnetic member) 13 arranged between the operation lever 11 and the reed switch 12. The operation lever 11 is formed of nonmagnetic material such as resin or aluminum; a permanent magnet 14 is incorporated into the operation lever 11. The operation lever 11 is pivoted on a pivot shaft 15. In other words, the operation lever 11 is provided between the on position "ON" and the off position "OFF" of the engine switch 10 so that the operation lever 11 is freely turned therebetween as indicated by an arrow 16. In the figure, the operation lever 11 in the off position is represented by solid lines, and the operation lever 11 in the on position is represented by dotted lines.

As shown in FIG. 1, the reed switch 12 and the limiter 13 are arranged close to the permanent magnet 14 of the operation lever 11 in the on position, and, in the operation lever 11 in the off position, the permanent magnet 14 is arranged close to the lid 7 of the valve case 4. An ignition device 17 is connected to both ends of the reed switch 12. For example, the ignition device 17 is the open type described above. In the ignition device 17 of the open type, when the reed switch 12 is on, the ignition can be turned on. Instead of the open type, as the ignition device 17, the short-circuit type may be used. In that case, the reed switch 12 is arranged on the off side of the engine switch 10, that is, on the side where the shutoff valve 2 is positioned. When a power supply such as a battery is constantly available, instead of the reed switch 12, a sensor such as a Hall element is arranged, and thus it is possible to detect the proximity of the permanent magnet 14.

The limiter 13 is provided so that, when the engine switch 10 is on, the operation lever 11 is attracted to the side of the limiter 13 by the action of the permanent magnet 14, and the user can feel an operation feeling (corresponding to the click hold feeling in Patent Document 1) when the operation lever 11 is operated to shift to the on position. Hence, whether the used ignition device is the open type or the short-circuit type, the limiter 13 is preferably arranged in the on position of the engine switch 10. An operation feeling when the operation lever 11 is operated to shift to the off position can be acquired as a force with which the permanent magnet 14 attracts the valve member 3.

Since, when the operation lever 11 is arranged as shown in FIG. 1, the operation lever 11 is easily shifted to the off position due to its own weight, if the user stops the operation in an intermediate position between the on position and the off position, the operation lever 11 is shifted to the off position, which is generally considered to be the safety side, that is, the side on which the engine is stopped. As a matter of course, a spring for applying a force to the operation lever 11 toward the off position may be provided so that, when the operation lever 11 is operated halfway, the state in which the engine is stopped is reliably secured.

Since, in the operation, when the operation lever 11 is in the off position, the permanent magnet 14 is close to the shutoff valve 2, the valve member 3 is shifted to the side of the lid 7, that is, the first position by being adsorbed by the permanent magnet 14. Hence, the shutoff valve 2 is closed, and the supply of the fuel is shut off. Here, since the permanent magnet 14 is separate from the reed switch 12, the off operation is performed. Thus, the operation of igniting the engine by the open type ignition device 17 is stopped.

When the engine is started, the user turns the operation lever 11 to the on position. Thus, since the permanent magnet 14 is separated from the valve member 3, the magnetic force exerted by the permanent magnet 14 does not act on the valve member 3, and the valve member 3 is shifted to an arrow 9 to open the shutoff valve 2, with the result that the fuel can be supplied. When the operation lever 11 reaches the on position, the reed switch 12 is turned on, and thus the open type ignition device 17 can ignite the engine.

As described above, in the present embodiment, a single operation of operating only the operation lever 11 is performed, and thus it is possible to switch the fuel supply between the start and the stop and to switch the operation of the ignition device between an allowed state and a non-allowed state. As described above, the spring for applying a force to the operation lever 11 toward the off position is provided, and thus it is possible to increase an operational torque when the operation lever 11 is shifted to the on position. Moreover, by changing the thickness (represented by a symbol t in FIG. 1) of a part covering the permanent magnet 14 of the nonmagnetic member forming the operation lever 11, it is possible to adjust the intensity of the operation feeling, that is, the click hold feeling. Specifically, as the thickness t is increased, the intensity of the click hold feeling is reduced whereas as the thickness t is decreased, the intensity of the click hold feeling is increased.

In order to provide the click hold feeling, the conventional art disclosed in Patent Document 1 may be applied. In other words, with the positioning mechanism using the ball to which a force is applied by the recessed notch and the spring, it is possible to provide the click hold feeling.

Although, in the embodiment described above, the permanent magnet 14 is provided in the operation lever 11 and thus the valve member 3 is made to function as the magnetic member, the valve member 3 is formed either with a permanent magnet or with a cylinder having a permanent magnet in an upper end portion, that is, a portion positioned on the side of the lid 7, and thus the operation lever 11 is made to function as the magnetic member, with the result that it is possible to expect the same effect as described with reference to FIG. 1. When the operation lever 11 is made to function as the magnetic member, for example, an induction type proximity switch that operates when a magnetic member approaches the switch is used as the reed switch 12.

Figure 2:
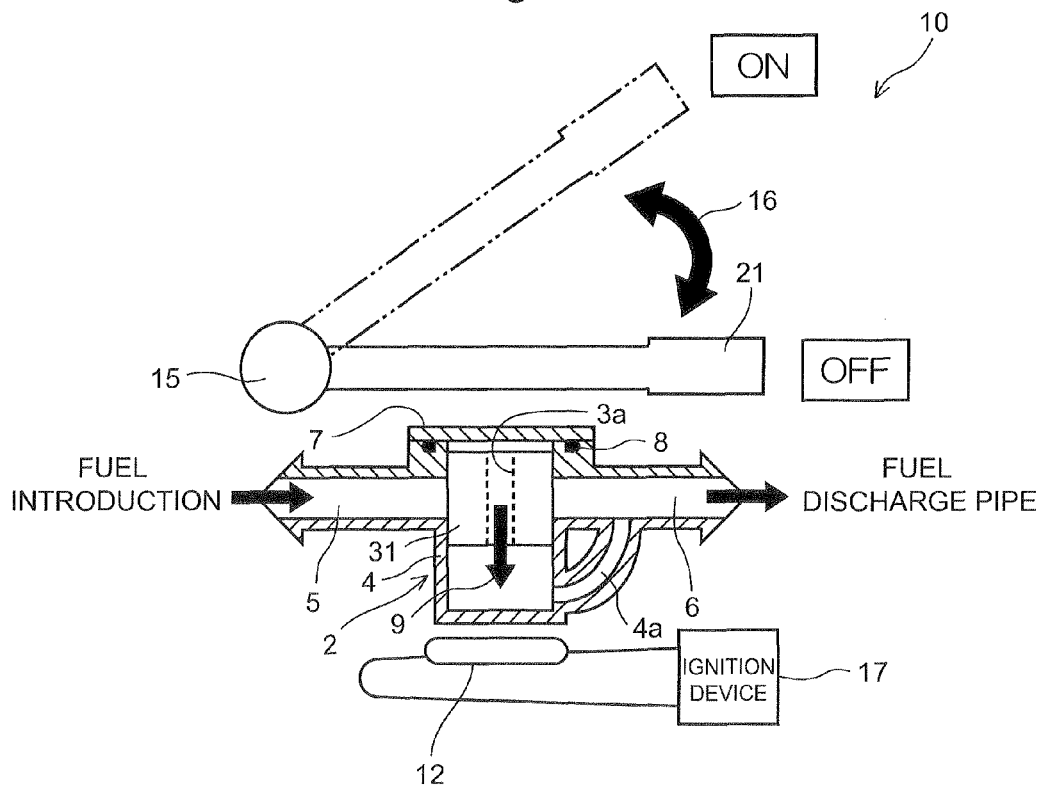
FIG. 2 is a diagram showing a fuel cock-integrated engine switch according to a variation of a first embodiment.

FIG. 2 is a diagram related to a variation of the engine switch shown in FIG. 1; the same symbols as shown in FIG. 1 represent the same or equivalent portions. In FIG. 2, an operation lever 21 is formed with a magnetic member (for example, iron). A valve member 31 is a cylindrical member having a permanent magnet in at least an upper end and a lower end. Below the valve case 4, a reed switch 12 in which an ignition device 17 is connected to both ends thereof is arranged.

In the variation shown in FIG. 2, since, when the operation lever 21 is in the off position, the operation lever 21 is close to the shutoff valve 2, the valve member 31 having a permanent magnet is shifted to the side of the lid 7, that is, the first position by being adsorbed by the operation lever 21. Hence, the shutoff valve 2 is closed, and the supply of the fuel is shut off. Here, since the valve member 31 having the permanent magnet is separated from the reed switch 12 arranged below the valve case 4, the reed switch 12 performs the off operation. Thus, the operation of igniting the engine by the open type ignition device 17 cannot be performed.

When the engine is started, the user turns the operation lever 21 to the on position. Thus, since the valve member 31 is separated from the operation lever 21, the valve member 31 is shifted to the side of the arrow 9 to open the shutoff valve 2, with the result that the fuel can be supplied. When the operation lever 21 is operated to shift to the on position, the valve member 31 becomes close to the reed switch, and thus the reed switch 12 is turned on, with the result that the open type ignition device 17 can ignite the engine.

Although, in the embodiment shown in FIG. 1 and FIG. 2, the pivot shaft 15 is perpendicular to the direction in which the valve members 3 and 31 are shifted, the pivot shaft 15 is arranged along the direction in which the valve members 3 and 31 are shifted, and the operation levers 11 and 21 may turn in a turning plane that is perpendicular to the direction in which the valve members 3 and 31 are shifted. That is, it is possible to make the turning plane of the operation levers 11 and 21 a plane that is along the upper surface of the valve members 3 and 31 or the lid 7.

Figure 3:
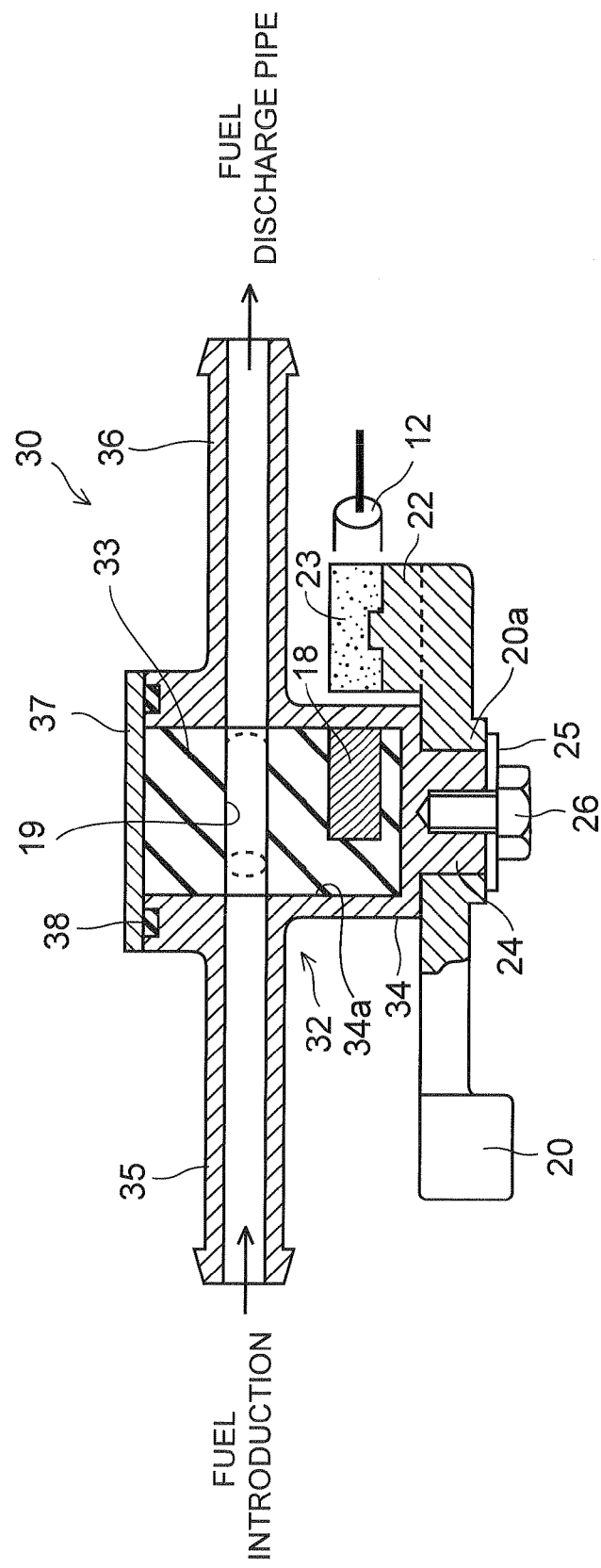
FIG. 3 is a front cross-sectional view showing the configuration of a fuel cock-integrated engine switch according to a second embodiment of the present invention.
Figure 4:
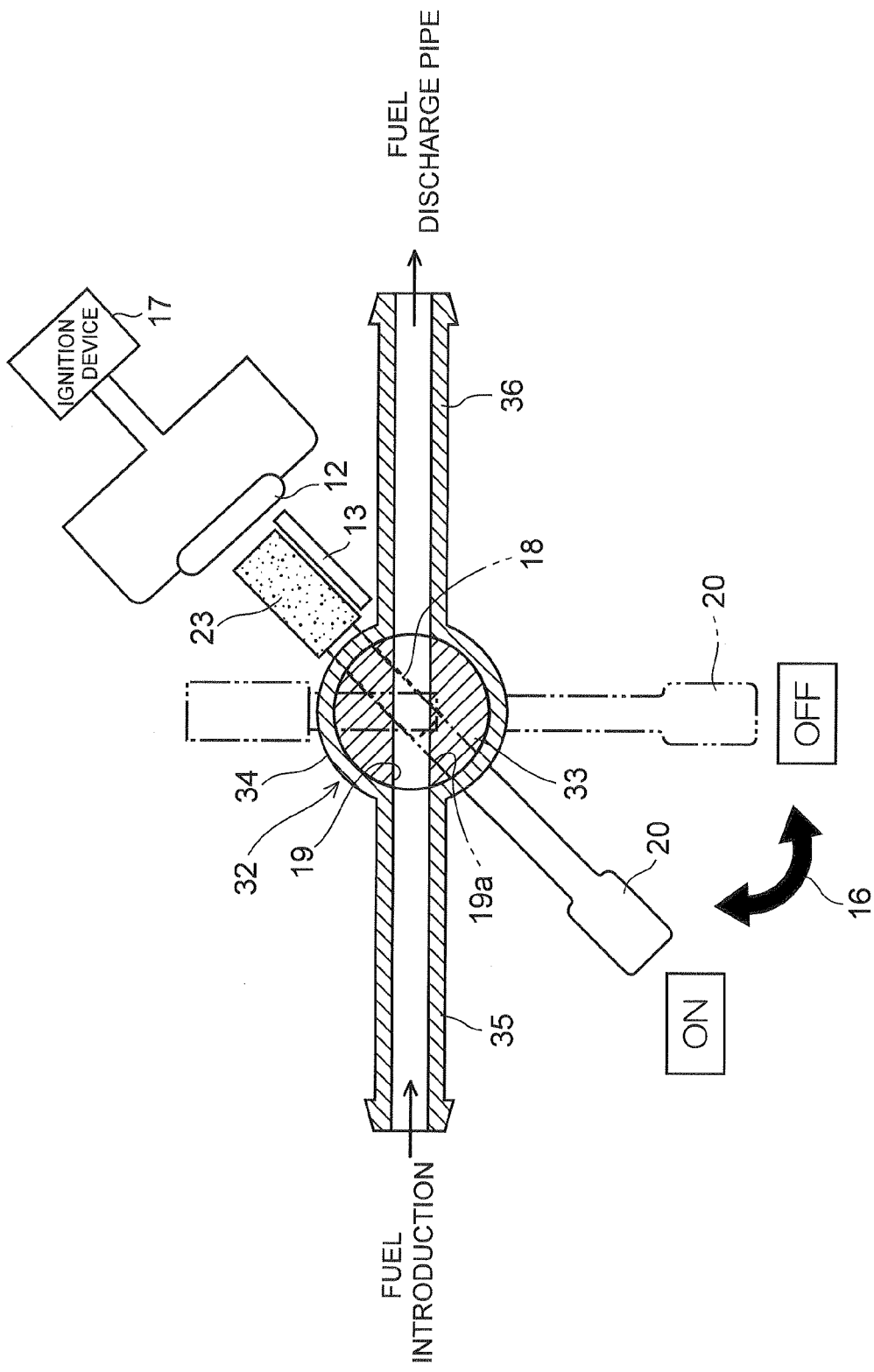
FIG. 4 is a plan view (partial cross-sectional view) showing the configuration of the fuel cock-integrated engine switch according to the second embodiment.

Next, a second embodiment of the present invention will be described. FIG. 3 is a front view of an engine switch of the second embodiment; FIG. 4 is a plan view thereof. For ease of understanding the main portions, FIG. 3 shows a state where the operation lever is arranged parallel to the fuel introduction pipe and the fuel discharge pipe, and FIG. 4 shows a planar cross-sectional view in the center line position of the fuel introduction pipe and the fuel discharge pipe.

In FIGS. 3 and 4, an engine switch 30 is provided with a shutoff valve 32 in a fuel passage that connects a fuel tank and a carburetor that are not shown. The shutoff valve 32 has a cylindrical valve member 33 and a valve case 34 including a cylinder portion 34a that accommodates the valve member 33. The valve member 33 accommodated in the valve case 34 is arranged turnably within the cylinder portion 34a about the cylinder axis of the cylinder portion 34a.

The valve case 34 is coupled to the fuel introduction pipe 35 and the fuel discharge pipe 36. The valve case 34 may be formed integrally with the fuel introduction pipe 35 and the fuel discharge pipe 36. A lid 37 is provided on the top portion of the valve case 34. A seal 38 such as an O-ring is provided on a surface on which the lid 37 and the valve case 34 are in contact with each other.

The valve case 34, the fuel introduction pipe 35, the fuel discharge pipe 36 and the lid 37 are formed of a nonmagnetic member, for example, resin or aluminum. Likewise, the valve member 33 is formed of a nonmagnetic member. The valve member 33 as a whole is formed of the nonmagnetic member; a magnetic member, for example, an iron piece 18 that can be adsorbed by a magnet is embedded in part of the valve member 33. The valve member 33 is provided with a fuel passage hole 19 that penetrates the valve member 33 in a direction perpendicular to a cylinder axis, that is, in a diameter direction.

When the fuel passage hole 19 is in a position represented by solid lines in FIGS. 3 and 4, the shutoff valve 32 is in an open position, and the fuel introduction pipe 35 communicates with the fuel discharge pipe 36 via the fuel passage hole 19. On the other hand, when the operation lever 20 is in a position represented by two-dot chain line in FIG. 4, the shutoff valve 32 is in a closed position, the fuel introduction pipe 35 and the fuel discharge pipe 36 are shut off by the valve member 33, with the result that the fuel cannot be distributed within the fuel passage 1.

In order to turn the valve member 33, the engine switch 30 has an operation lever 20, a magnet attachment portion 22 provided in the operation lever 20 and a permanent magnet 23 attached to the magnet attachment portion 22. The permanent magnet 23 is arranged opposite to the iron piece 18 through the wall of the valve case 34.

An intermediate portion 20a of the operation lever 20 is fitted to the outer circumference of a boss 24 formed by extending the valve case 34 downward so as to be freely turned with respect to its outer circumference. A bolt 26 is screwed via a washer 25 to an end portion of the boss 24 so as to prevent the intermediate portion 20a of the operation lever 20 from coming off of the boss 24.

The reed switch 12 is arranged adjacent to the permanent magnet 23 when the operation lever 20 is operated to shift to the on position. The open type ignition device 17 is connected to both ends of the reed switch 12. As in the first embodiment, the reed switch 12 may be the short-circuit type.

The operation of the engine switch 30 shown in FIG. 3 and FIG. 4 is as follows. When the permanent magnet 23 approaches the iron piece 18 embedded in the valve member 33, the iron piece 18 is attracted to the permanent magnet 23. Hence, when the operation lever 20 that operates together with the permanent magnet 23 is operated to turn with respect to the valve case 34, the iron piece 18 is shifted together with the permanent magnet 23 (in other words, they are turned together). Therefore, not only the iron piece 18 but also the valve member 33 is turned so as to follow the movement of the operation lever 20.

The valve member 33 is turned so that, when the operation lever 20 is in the off position (OFF), the fuel passage hole 19 is in a position 19a that the fuel passage hole 19 shuts off the fuel introduction pipe 35 and the fuel discharge pipe 36. Since, in the off position, the permanent magnet 23 is away from the reed switch 12, the reed switch 12 performs the off operation. Thus, the operation of igniting the engine by the open type ignition device 17 is stopped. In this way, when the operation lever 20 is in the off position, both the fuel supply and the ignition operation are stopped.

When the operation lever 20 is turned to the on position so that the engine is started, the valve member 33 is turned together with the permanent magnet 23, and the fuel passage hole 19 is shifted to a position that the fuel passage hole 19 is aligned with the fuel introduction pipe 35 and the fuel discharge pipe 36. Thus, the shutoff valve 32 is opened to allow the fuel supply. At the same time, the permanent magnet 23 approaches the reed switch 12, and thus the reed switch 12 is turned on, with the result that the ignition of the engine by the open type ignition device 17 can be performed.

As described above, in the second embodiment, a single operation of operating only the operation lever 20 is performed, and thus it is possible to switch the fuel supply between the start and the stop and to switch the operation of the ignition device between an allowed state and a non-allowed state. As described in the first embodiment (FIG. 1), when the short-circuit type is used as the ignition device 17, the reed switch 12 is arranged close to the permanent magnet 23 when the operation lever 20 is in the off position. When a power supply such as a battery is constantly available, instead of the reed switch 12, a sensor such as a hall element is arranged, and thus it is possible to detect the proximity of the permanent magnet 23.

Although the present invention is described according to the embodiments, the present invention is not limited to these embodiments, and variations are possible based on the scope of claims and known art. For example, although, in the first embodiment, the permanent magnet 14 is provided in the operation lever 11, and the valve member 3 is formed of the magnetic member, an absorption force may be further increased by providing a permanent magnet in the side of the valve member 3. Likewise, in the second embodiment, it is possible to make the iron piece 18 a permanent magnet and make the side of the permanent magnet 23 an iron piece. Moreover, the permanent magnet 23 is used, and the iron piece 18 may be replaced with a permanent magnet.

When, in the second embodiment, the limiter 13 is arranged between the reed switch 12 and the permanent magnet 23 or when the permanent magnet 23 is present in the on position, the limiter 13 is arranged close to the side surface of the permanent magnet 23. Hence, it is also possible for the user to feel the click hold feeling on the hand when the operation lever 20 is operated to shift to the on position. The position of the limiter 13 is shown in FIG. 4.

Although the present invention is described using the embodiments, the present invention is not limited to these embodiments, and variations are possible based on the scope of claims and known art. In short, a configuration is preferably made so that an attraction force resulting from a magnetic force is made to act between the valve member and the operation lever which form the shut off valve, and, as the operation member is shifted between the on position and the off position, the valve member is shifted between the side on which the valve member opens the shutoff valve and the side on which the valve member shuts off the shutoff valve.

REFERENCE SIGNS LIST

2 . . . shutoff valve
3, 31, 33 . . . valve member
4, 34 . . . valve case
5, 35 . . . fuel introduction pipe
6, 36 . . . fuel discharge pipe
7, 37 . . . lid
8 . . . seal
10, 30 . . . engine switch
11, 20, 21 . . . operation lever
12 . . . reed switch
13 . . . limiter
14, 23 . . . permanent magnet 15 ... pivot shaft
17 ... ignition device
18 ... iron piece
19 ... fuel passage hole
24 ... boss

The invention claimed is:

1. A fuel cock-integrated engine switch comprising:
a fuel shutoff valve (2) that is provided in a fuel passage supplying fuel to an engine and that includes a valve member (3) which closes the fuel passage in a first position and which opens the fuel passage in a second position;
an operation member (11) that is operated between an off position for stopping the engine and an on position for operating the engine;
a proximity switch (12) that is provided in the on position; and
a permanent magnet (14) that is attached to at least one of the operation member (11) and the valve member (3),
wherein the other one of the operation member (11) and the valve member (3) to which the permanent magnet (14) is not attached is formed with a magnetic member,
the operation member (11) and the valve member (3) are arranged so that, in the off position, a magnetic force exerted by the permanent magnet (14) acts between the valve member (3) and the operation member (11) to make the valve member (3) shift to the first position whereas, in the on position, the magnetic force exerted by the permanent magnet (14) does not act between the valve member (3) and the operation member (11) to make the valve member (3) shift to the second position, and
an ignition device (17) is connected to the proximity switch (12) so that, when the operation member (11) approaches an operational range of the proximity switch (12), the ignition device (17) of the engine is operated whereas, when the operation member (11) is out of the operational range of the proximity switch (12), the ignition device (17) is not operated.

2. The fuel cock-integrated engine switch according to claim 1, further comprising:
a valve case (4) that accommodates the valve member (3) so that the valve member (3) is movable in a reciprocating manner between the first position and the second position,
wherein a fuel introduction side and a fuel discharge side of the fuel passage are coupled to a wall portion of the valve case (4), and
a portion of the fuel passage that is coupled to the valve case (4) is closed in the first position and is opened in the second position by a side surface portion of the valve member (3).

3. The fuel cock-integrated engine switch according to claim 1,
wherein the valve member (3) is cylindrical, the valve case (4) includes a cylinder portion that accommodates the cylindrical valve member (3) and the fuel introduction side and the fuel discharge side of the fuel passage are open to the cylinder portion.

4. The fuel cock-integrated engine switch according to claim 2,
wherein the valve member (3) is cylindrical, the valve case (4) includes a cylinder portion that accommodates the cylindrical valve member (3) and the fuel introduction side and the fuel discharge side of the fuel passage are open to the cylinder portion.

5. The fuel cock-integrated engine switch according to claim 1,
wherein the operation member (11) is an operation lever that is pivoted and that is formed with a nonmagnetic member, and the permanent magnet (14) is embedded in the operation lever.

6. The fuel cock-integrated engine switch according to claim 1,
wherein the permanent magnet (14) is attached to the operation member (11),
the valve member (3) is formed with a magnetic member and,
in the on position of the operation member (11), a limiter (13) that is arranged between the operation member (11) and the proximity switch (12) and that is formed with a magnetic member is arranged.

7. A fuel cock-integrated engine switch comprising:
a fuel shutoff valve (2) that is provided in a fuel passage supplying fuel to an engine and that includes a valve member (31) which closes the fuel passage in a first position and which opens the fuel passage in a second position;
an operation member (21) that is operated between an off position for stopping the engine and an on position for operating the engine and that is formed with a magnetic member;
a proximity switch (12) that is arranged close to the valve member (31) on a side of the second position; and
a permanent magnet that is provided either in a whole of the valve member (31) or at least in both end portions of the valve member (31) in a shift direction,
wherein the operation member (21) and the valve member (31) are arranged so that, in the off position, a magnetic force exerted by the permanent magnet provided in the valve member (31) acts on the operation member (21) to make the valve member (31) shift to the first position whereas, in the on position, the magnetic force exerted by the permanent magnet provided in the valve member (31) does not act on the operation member (21) to make the valve member (31) shift to the second position, and
an ignition device (17) is connected to the proximity switch (12) so that, when the valve member (31) approaches an operational range of the proximity switch (12), the ignition device (17) of the engine is operated whereas, when the valve member (31) is out of the operational range of the proximity switch (12), the ignition device (17) is not operated.

8. The fuel cock-integrated engine switch according to claim 7, further comprising:
a valve case (4) that accommodates the valve member (3) so that the valve member (3) is movable in a reciprocating manner between the first position and the second position,
wherein a fuel introduction side and a fuel discharge side of the fuel passage are coupled to a wall portion of the valve case (4), and
a portion of the fuel passage that is coupled to the valve case (4) is closed in the first position and is opened in the second position by a side surface portion of the valve member (3).

9. The fuel cock-integrated engine switch according to claim 7,
wherein the valve member (3) is cylindrical, the valve case (4) includes a cylinder portion that accommodates the cylindrical valve member (3) and the fuel introduction side and the fuel discharge side of the fuel passage are open to the cylinder portion.

10. The fuel cock-integrated engine switch according to claim 4,
wherein the valve member (3) is cylindrical, the valve case (4) includes a cylinder portion that accommodates the cylindrical valve member (3) and the fuel introduction side and the fuel discharge side of the fuel passage are open to the cylinder portion.

11. A fuel cock-integrated engine switch comprising:
a valve case (34) that is provided in a fuel passage supplying fuel to an engine and that includes a cylindrical valve member accommodation portion;
a valve member (33) including a fuel passage hole (19) penetrating a cylinder in a direction of a diameter of the cylinder that is formed with a cylindrical nonmagnetic member accommodated in the valve case (34) turnably about a cylinder axis of the accommodation portion within the cylindrical valve member accommodation portion and that forms the valve member (33);
an operation lever (20) that is provided between an off position for stopping the engine and an on position for operating the engine so as to be turned on a same axis as the cylinder axis; and
a proximity switch (12) that is arranged in the on position,
wherein, on a side portion of the cylinder that forms the valve member (33), at least one (18) of a magnetic member and a permanent magnet is arranged,
the other one (23) of the magnetic member and the permanent magnet arranged, via the valve case (34), opposite to the one (18) of the magnetic member and the permanent magnet is attached to the operation lever (20), and
the one (18) of the magnetic member and the permanent magnet turns together with a movement of the operation lever (20),
the valve member (33) and the valve case (34) are arranged so that, when the operation lever (20) is in the on position, the fuel passage hole (19) is aligned with the fuel passage, and
an ignition device (17) is connected to the proximity switch (12) so that, when the operation lever (20) approaches an operational range of the proximity switch (12), the ignition device (17) of the engine is operated whereas, when the operation lever (20) is out of the operational range of the proximity switch (12), the ignition device (17) is not operated.

12. The fuel cock-integrated engine switch according to claim 11,
wherein the valve case (34) includes a boss (24) that is arranged coaxially with the cylinder axis of the cylindrical valve member accommodation portion, and
the operation lever (20) is freely turned attached to the boss (24).

13. The fuel cock-integrated engine switch according to claim 12,
wherein the permanent magnet (23) is provided as the other one of the magnetic member and the permanent magnet provided in the operation lever (20), and
a limiter (13) is arranged close to the permanent magnet (23) when the operation lever (20) is in the on position.

* * * * *